March 21, 1939.　　　M. K. GOLDEN　　　2,151,639

IGNITION CONTROL FOR MOTOR VEHICLES

Filed June 23, 1938

INVENTOR.
Max K. Golden
BY S. E. Thomas
ATTORNEY.

Patented Mar. 21, 1939

2,151,639

UNITED STATES PATENT OFFICE 2,151,639

IGNITION CONTROL FOR MOTOR VEHICLES

Max K. Golden, Detroit, Mich.

Application June 23, 1938, Serial No. 215,490

3 Claims. (Cl. 123—146.5)

My invention relates to a control and recording device for automotive trucks, and contemplates an improved apparatus which shall obviate danger from fire in case of accident and which shall prevent the running of the engine when the driver is absent and shall record the number of times he has left his seat.

I secure this object by the means shown in the accompanying drawing in which.

Figure 1:
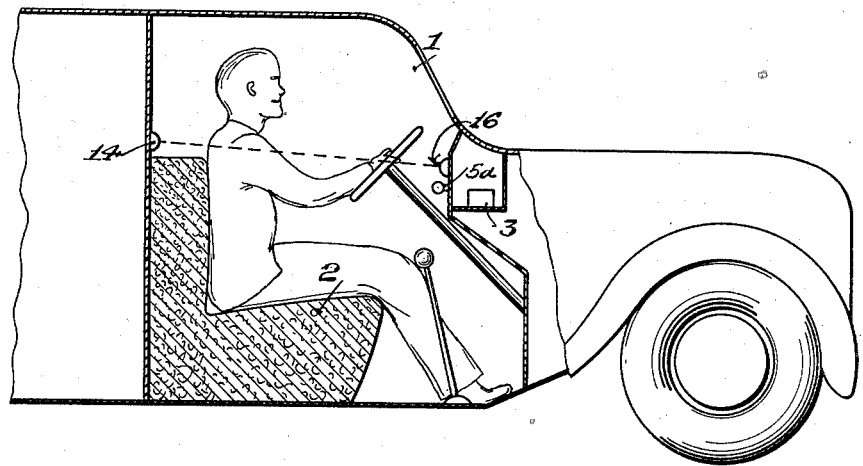
Figure 1 is a side elevation of an automotive truck, partly in section:—with apparatus embodying my invention thereon.

Referring now to the reference numerals upon the drawing:

Numeral 1 indicates a truck body and 2 the front seat therein. Numeral 3 indicates a control box, or casing for the mechanism. Numeral 5 indicates the primary circuit of the ignition system. Numeral 4 indicates a switch arm, pivoted at 4a, and normally held in contact with the post 4b, by a spring 6, to complete the ignition circuit 5. Numeral 7 is a magnet interposed in circuit 8, including the car battery 15.

Numeral 9 is a mechanical counter having a ratchet wheel 10, on its operating shaft.

Numeral 11 is a pawl pivoted at 12 to the switch arm 4, and at its free end provided with a hook held in contact with the periphery of the wheel 10, by a spring 13. The parts being so arranged that at every oscillation of the arm 4, the wheel 10 will be turned one notch, and the next consecutive number of the counter will be displayed.

Numeral 14 denotes an electric lamp energized by a circuit 14a from the car battery 15. Numeral 16 indicates a photoelectric cell of selenium, or other suitable type interposed in the electric circuit 8. The lamp 14 is located at the left hand side of the automotive truck, or automobile, just back of the front seat, the photoelectric cell is mounted on the right side of the windshield post or other suitable place. The lamp 14 is so formed and located as to project a ray across the space occupied by the driver when in position to drive the truck, and against the cell 16.

Figure 2:
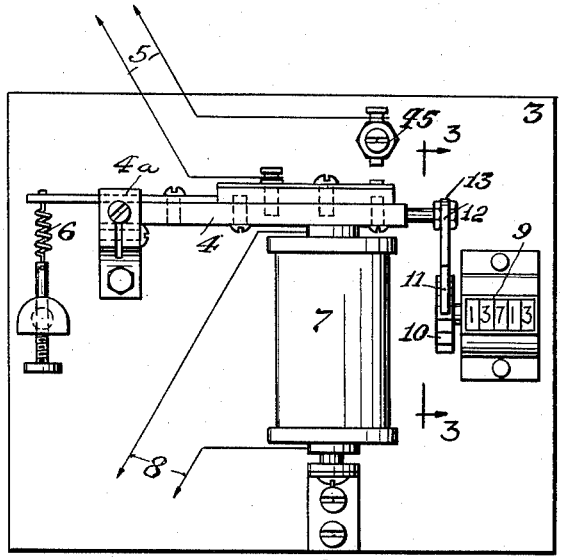
Figure 2 is a detail of the magnetic control switch and recording apparatus, on an enlarged scale.
Figure 3:
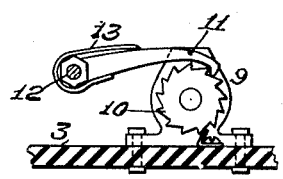
Figure 3 is a detail elevation partly in section of the actuating mechanism for the recording device or counter, taken from the position indicated by the arrows on line 3—3 of Figure 2.
Figure 4:
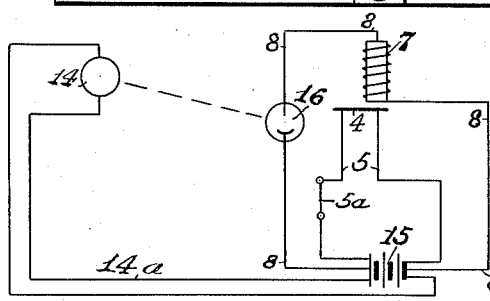
Figure 4 is a diagram of the electric apparatus and currents.

The operation of the above described device is as follows:

When the front seat is unoccupied the ray of light from the lamp 14 falls upon the cell 16 and causes a current to pass through the circuit 8, energizing the magnet 7 and breaking the ignition circuit 5, as shown in Figure 2. When the driver is seated in position his body interrupts the ray of light from the lamp 14 to the cell 16, and the current in the circuit 8 ceases and the arm 4 rises into contact with the post 4b, thereby completing the ignition circuit 5 and actuating the ratchet wheel 10, to record an additional number by the counter 9.

The entire mechanism will be automatically disconnected when the ignition of the car is turned off by the ignition key 5a of the car in the conventional way.

The above described apparatus is a safe, positive and convenient method of turning off the ignition of the car so that the motor will not run when the car is without a driver, thus saving fuel and wear:—and in case of accident with the driver thrown from his seat, the ignition circuit will be broken so that the gasoline may not be ignited.

The number of times the driver has left his truck will be automatically recorded, thus effecting a check on his services in that particular.

What I claim is:

1. The combination in an automobile having a seat for the driver, and an ignition circuit; a circuit adapted to break said ignition circuit when energized, a cell in the last named circuit; and a lamp adapted to project a ray of light across the space to be occupied by the driver into said cell to energize the last named circuit.

2. The combination in an automobile having a seat for the driver, and an ignition circuit; a mechanical counter; a circuit adapted to break said ignition circuit and to actuate said counter, when energized; a cell in the last named circuit; and a lamp adapted to project a ray of light across the space to be occupied by the driver into said cell, to energize the last named circuit and to operate said counter.

3. The combination in an automobile having a seat for the driver, and an ignition circuit; a mechanical counter; a magnetic switch, having a movable arm, adapted to make and break said circuit by the movement of said arm; a ratchet wheel, adapted to actuate said counter; a pawl upon said arm, adapted to actuate said ratchet wheel; a circuit through the magnet of said switch, including a photoelectric cell; and a lamp adapted to project a ray of light across the space to be occupied by the driver into said cell to energize the last named circuit and break the ignition circuit.

MAX K. GOLDEN.